United States Patent
Nagayama

(10) Patent No.: US 6,806,928 B2
(45) Date of Patent: Oct. 19, 2004

(54) REFLECTION MEMBER AND LIQUID CRYSTAL DISPLAY DEVICE USING THE SAME

(75) Inventor: Kohei Nagayama, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/430,290

(22) Filed: May 7, 2003

(65) Prior Publication Data
US 2004/0008436 A1 Jan. 15, 2004

(30) Foreign Application Priority Data
May 9, 2002 (JP) ........................ 2002-134540

(51) Int. Cl.$^7$ .................. G02F 1/1335; G02B 5/02
(52) U.S. Cl. ........................... 349/113; 359/599
(58) Field of Search .................. 349/113; 359/599

(56) References Cited

U.S. PATENT DOCUMENTS

| | | | | |
|---|---|---|---|---|
| 4,519,678 A | * | 5/1985 | Komatsubara et al. | 349/160 |
| 5,288,591 A | * | 2/1994 | Blonder | 430/321 |
| 5,949,507 A | * | 9/1999 | Shimada et al. | 349/113 |

\* cited by examiner

Primary Examiner—Robert H. Kim
Assistant Examiner—Andrew Schechter
(74) Attorney, Agent, or Firm—Oblon, Spivak, McClelland, Maier & Neustadt, P.C.

(57) ABSTRACT

A reflection member applicable to a liquid crystal display device is disclosed. The liquid crystal display device includes a reflective pixel electrode 19 formed on a matrix array substrate 11, a counter electrode provided opposite to the reflective pixel electrode 19 on a counter substrate 22, and a liquid crystal layer 27 held between the reflective and counter electrodes 19 and 25. The reflective pixel electrodes 19 have convex and concave portions 20a and 20b as light scattering elements. Centers of the convex portions 20a are disposed in lattice points of hexagonal lattices. Lattice parallel vectors are rotated around the radius center by an angle of about 60°, defined between the lattice points at both end portions of the pixel electrode, but, more suitably, the one ranging from 51.4° to 68.6°, i.e., 60°±8.6°. Such disposition of the light scattering elements reduces two dimensional periodicity as to the convex portions. Thus coloring caused by optical interference between the convex portions 20 can be suppressed. Excellent display quality with uniform brightness is achieved by making distances between the light scattering elements consistent with those from which a optimal slant angle distribution can be obtained.

6 Claims, 6 Drawing Sheets

REFLECTION MEMBER AND LIQUID CRYSTAL DISPLAY DEVICE USING THE SAME

FIELD OF THE INVENTION

This invention relates to a reflection member and a liquid crystal display device using the same.

BACKGROUND OF THE INVENTION

Recently, liquid crystal display (LCD) devices have come into wide use for personal computers, television receivers, word processors, mobile phones, etc. The LCD devices are required to be much higher in performance, compact in size, with low power consumption and cost. In order to comply with such requirements, research and development is in progress with reflection type LCD devices to utilize incident ambient light by reflection as a light source, and hybrid (reflection and transparence) type LCD devices with both light reflection and transparent functions as a light source.

It is quite important how effectively incident ambient light is utilized to illuminate a display screen of LCD devices in the case of light reflection. Thus, a reflection member used in the LCD device is designed to effectively utilize incident ambient light from all angles to achieve optimal reflection.

As shown in FIG. 8, for instance, a reflection member 1, such as a reflective pixel electrode used for an LCD device, includes convex prominences 2 formed on its surface as light scattering elements which each are 3 $\mu$m to 20 $\mu$m in diameter and 0.3 $\mu$m to 1.2 $\mu$m in height. The centers of convex prominences 2 form hexagonal lattices with parallel vectors of an angle of 60° defined between adjacent convex prominences. The hexagonal lattices are regularly disposed in a constant distance. The regular disposition makes the reflection characteristic optimum because the convex prominences 2 scatter light and flat portions between them perform the specular reflection. Their optical interference, however, causes coloring.

For the purpose of avoiding such coloring, as shown in FIG. 9, the convex prominences 2 are provided at random, for instance, to collect scattering light in a limited region or to strengthen the intensity of scattering light in a specific observation direction.

The reflective pixel electrode 1 shown in FIG. 9, however, increases specular reflection regions so that it cannot provide the LCD device with a sufficiently bright display. In addition, since a light source image is reflected from the display surface and an observer moves it out of his viewing field, i.e., he or she avoids such a reflected image, the specular reflection regions do not practically contribute to improve the display brightness and he or she sees the display surface becoming dark. In short, the area of the specular reflection regions in the reflection member 1 depends on the distance between the convex prominences 2.

Now, sectional views of regions A, B and C in FIG. 9 are shown in FIGS. 10, 11 and 12, respectively. The distance between the adjacent convex prominences 2 is about 10 $\mu$m in region A, which has a small specular reflection area. In the case of region B, however, the distance between the convex prominences 2 is about 8 $\mu$m, so that overlapping, adjacent convex prominences 2 make their slope gentle and components in the vicinity of the specular reflection area increase.

The convex prominence 2 shown in FIG. 12 is about 12 $\mu$m apart from its adjacent convex prominences 2, so that flat regions are made between adjacent convex prominences 2 and the specular reflection regions increase. Thus, in order to make the specular reflection regions small in size, i.e., to avoid coloring, it is necessary to increase the existence rate of an appropriate distance between the adjacent convex prominences 2.

SUMMARY OF THE INVENTION

It is, accordingly, an object of the present invention to provide a reflection member with little coloring but desirable reflection characteristics and an LCD device using such a reflection member.

According to one aspect of the present invention, a reflection member includes a plurality of light scattering elements with substantially the same shapes which are distributed at lattice points determined by rotating parallel vectors of hexagonal lattices. Since such a distribution reduces two-dimensional regular dispositions of scattering elements, coloring resulting from optical interferences can be significantly suppressed. Distances between light scattering elements can also be kept constant to obtain optimal slope angle distributions. An LCD device using the light scattering elements can achieve a bright display with significant uniformity.

BRIEF DESCRIPTION OF THE DRAWINGS

A more complete appreciation of the present invention and many of the attendant advantages thereof will be readily obtained as the same becomes better understood by reference to the following detailed descriptions when considered in connection with the accompanying drawings, wherein.

DETAILED EXPLANATION OF THE PREFERRED EMBODIMENTS

A reflection type LCD device of an embodiment according to the present invention will be explained below with reference to the attached drawings.

Figure 2:
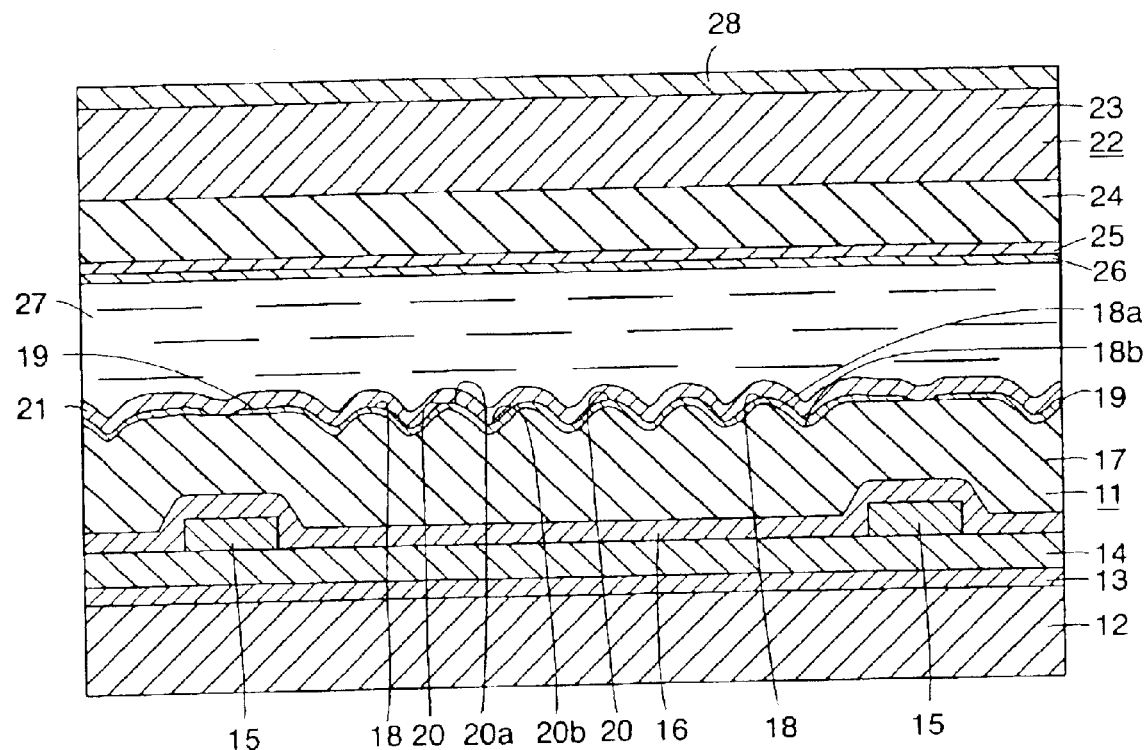
FIG. 2 is a sectional view of an LCD device of the invention.

As shown in FIG. 2, this reflection type LCD device includes a thin film transistor matrix array substrate 11, a counter substrate 22 provided opposite to the matrix array substrate 11, and a liquid crystal layer 27 held between the matrix array and counter substrates 11 and 22.

The matrix array substrate 11 has an insulation substrate 12, such as a glass substrate made of high strain point glass or quartz. The matrix array substrate 11 also includes a glass coating film 13, an insulation film 14, signal lines 15 formed on the insulation substrate 14, scanning lines intersecting but electrically insulated from the signal lines (not shown), and thin film transistors (not shown) provided in the vicinities of such intersecting points as switching elements. The signal lines 15 and insulation film 14 are covered with a transparent insulation protection film 16.

An organic resin insulation film 17 is formed on the protection film 16. Uneven patterns 18 are provided at regions of the upper surface of the organic resin insulation film 17 that correspond to those surrounded by the signal and scanning lines. The uneven patterns 18 have convex and concave portions 18a and 18b and are coated with metallic films or reflective pixel electrodes 19 made of aluminum (Al), nickel (Ni), chromium (Cr) or silver (Ag). The reflective pixel electrodes 19 are disposed in a matrix form and are connected to the thin film transistors. The uneven patterns 18 coated with the metallic films 19 constitute and correspond to the uneven patterns 20 having convex and concave portions 20a and 20b. The uneven patterns 20 function as light scattering elements.

Figure 1:
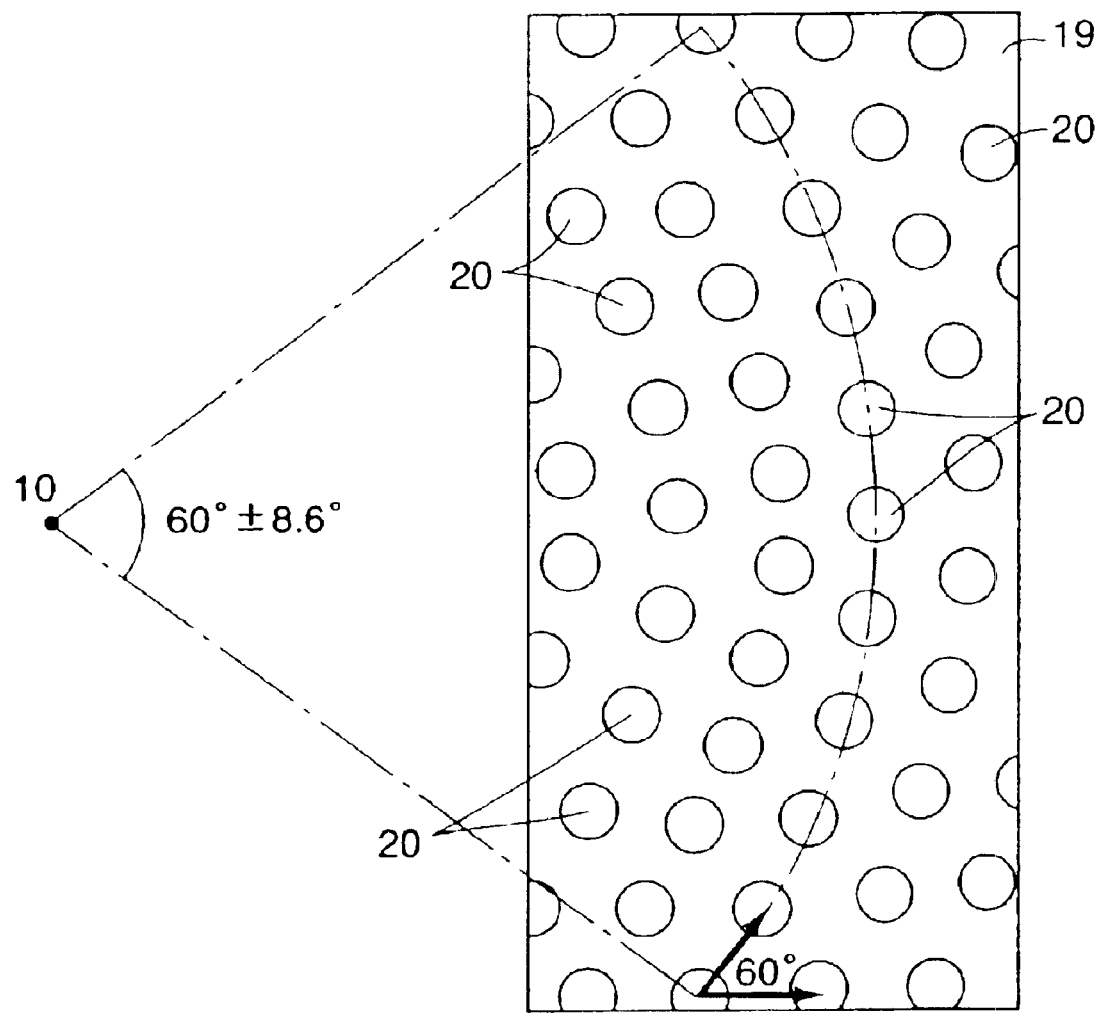
FIG. 1 shows a schematic disposition of convex prominences used for a reflective pixel electrode in accordance with an embodiment of the present invention.

As shown in FIG. 1, the convex portions 20 or light scattering elements are disposed in hexagonal lattice structures. The lattice parallel vectors of the convex portions 20 rotate gradually at a predetermined angle so that a rotation angle of the vectors defined between both ends of the pixel electrode 19 is about 60° but, more suitably, the one ranging from 51.4° to 68.6° (i.e., 60°±8.6°) with respect to the radius center 10. Thus, the centers of lattices are disposed along circular lines. The uneven patterns 20 and organic resin insulation film 17 are covered with an alignment film 21.

Similarly to the matrix array substrate 11, the counter substrate 22 includes an insulation substrate 23, such as a glass substrate made of high strain point glass or quartz. The glass substrate 25 is covered with a color filter film 24 on which a counter electrode 25 is formed. The counter electrode 25 is coated with an alignment film 26. The counter substrate 22 further includes a polarizer film 23 attached to the insulation substrate 23.

Thus, the LCD device basically consists of the matrix array and counter substrates 11 and 22, and the liquid crystal layer 27 held by the substrates 11 and 22. The alignment films 26 and 21, provided opposite to each other, control directions of the liquid crystal molecules.

Now, a method of forming the reflective pixel electrode 19 with the uneven patterns 20 will be explained below with reference to FIGS. 3 to 7.

Figure 3:
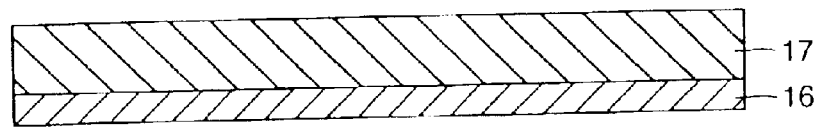
FIGS. 3 to 7 are sectional views of components to explain production steps of the reflective pixel electrode.

As shown in FIG. 3, the organic resin insulation film 17, made of a positive photoresist resin film, is entirely coated on the transparent insulation protection film 16 of the matrix array substrate 11 by applying a spin coating method or the like. The coated insulation film 17 is 1 µm to 4 µm in thickness.

Figure 4:
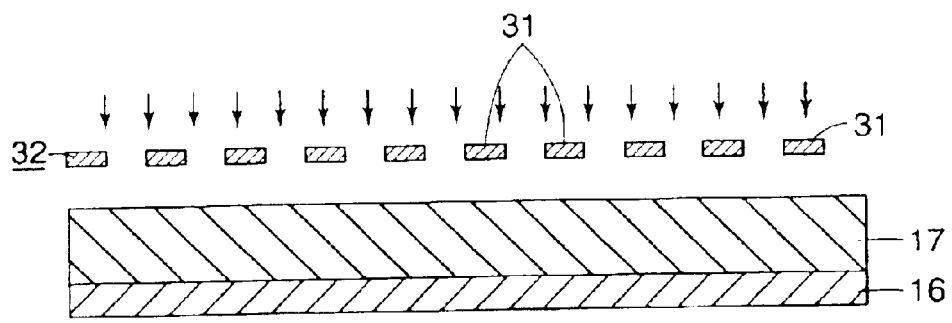

After the matrix array substrate 11, covered with the insulation films 16 and 17, is baked, an exposure is carried out with a photomask 32 as shown in FIG. 4. The photomask 32 has circular light shielding portions 31, the centers of which are provided at lattice points of hexagonal lattices. As shown in FIG. 1, the lattice points are determined by lattice parallel vectors which are rotated around the radius center 10 by an angle of about 60°, defined between the lattice points at both end portions of the reflective pixel electrode 19, but, more suitably, the one ranging from 51.4° to 68.6°, i.e., 60°±8.6°. Thus, the lattice point centers are disposed along circular lines. The uneven patterns 18 of the organic resin insulation film 17 are similar in shape to the uneven patterns 20 of the reflective pixel electrodes 19. Shape and density of the concave and convex portions are controlled in accordance with the apertures of the photomask 32 and exposure quantity. The light shielding portions 31 of the photomask 32 are circular, with each about 5 µm in diameter and 9.5 µm to 10.5 µm in distance between the centers of adjacent circles. The exposure quantity ranges from 10 mJ to 200 mJ.

Figure 5:
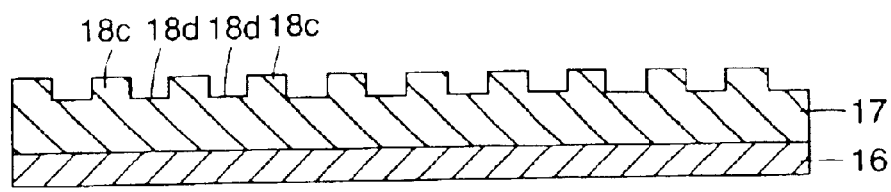

Development of the exposed insulation film 17 forms fine convex and concave portions 18c and 18d on the surface of the insulation film 17 as shown in FIG. 5. Since the exposure quantity ranges from 10 mJ to 200 mJ, the bottoms of the concave portions 18d do not reach the surface of the transparent protection insulation film 16.

Figure 6:
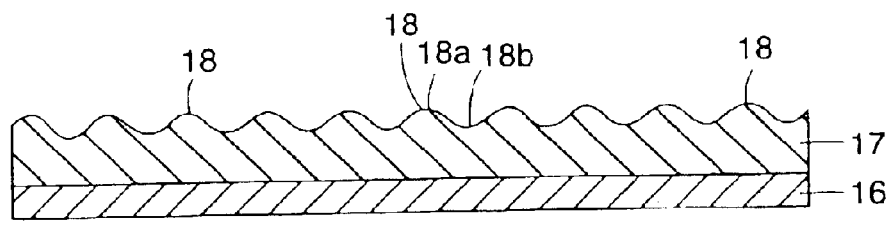

After that, the matrix array substrate 11 is subjected to heat treatment and corners of the convex and concave portions 18c and 18d are removed to make the uneven pattern 18 with smooth convex and concave portions 18a and 18b as shown in FIG. 6.

Figure 7:
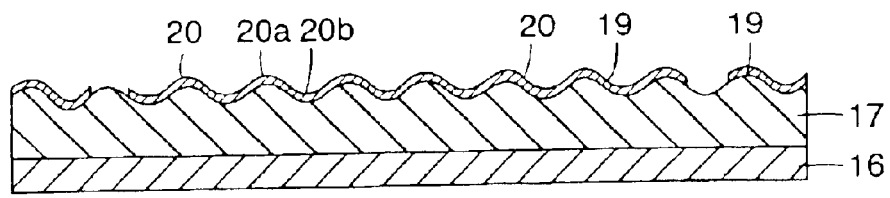
Figure 8:
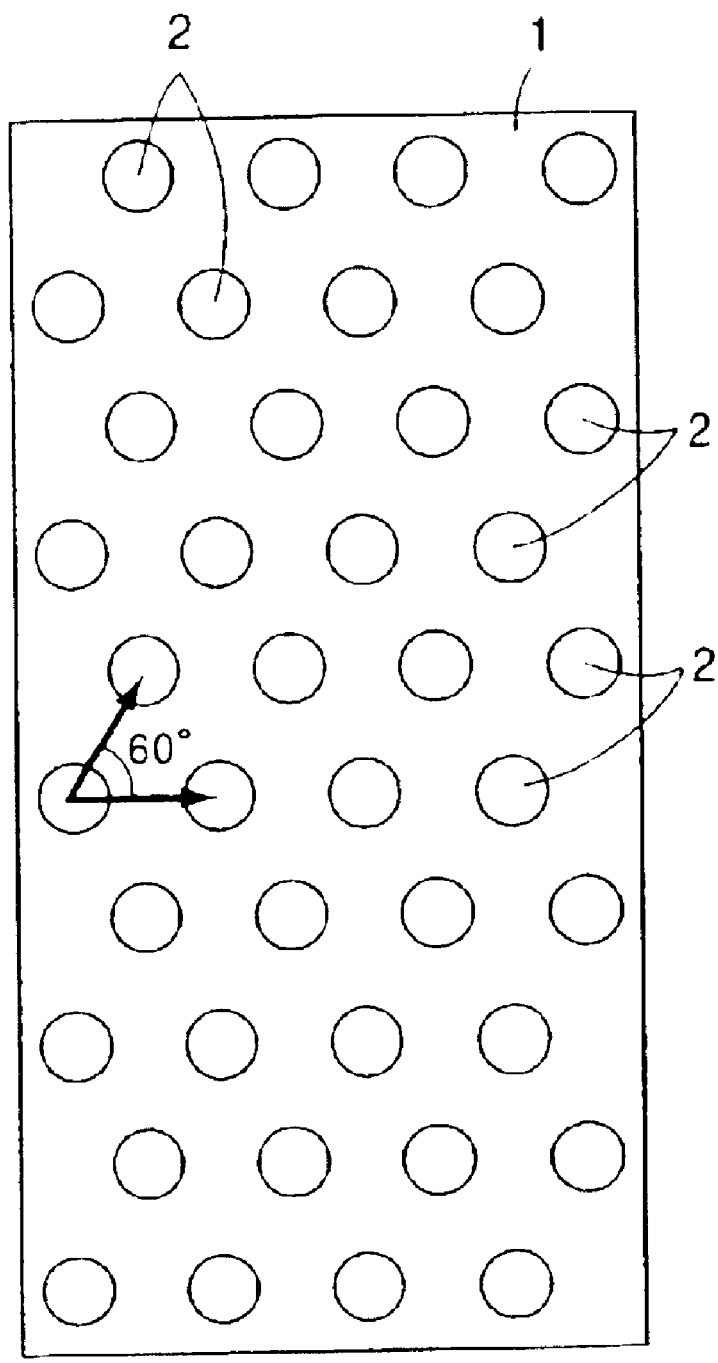
FIG. 8 shows a schematic disposition plan view of convex prominences used for a prior art reflective pixel electrode.
Figure 9:
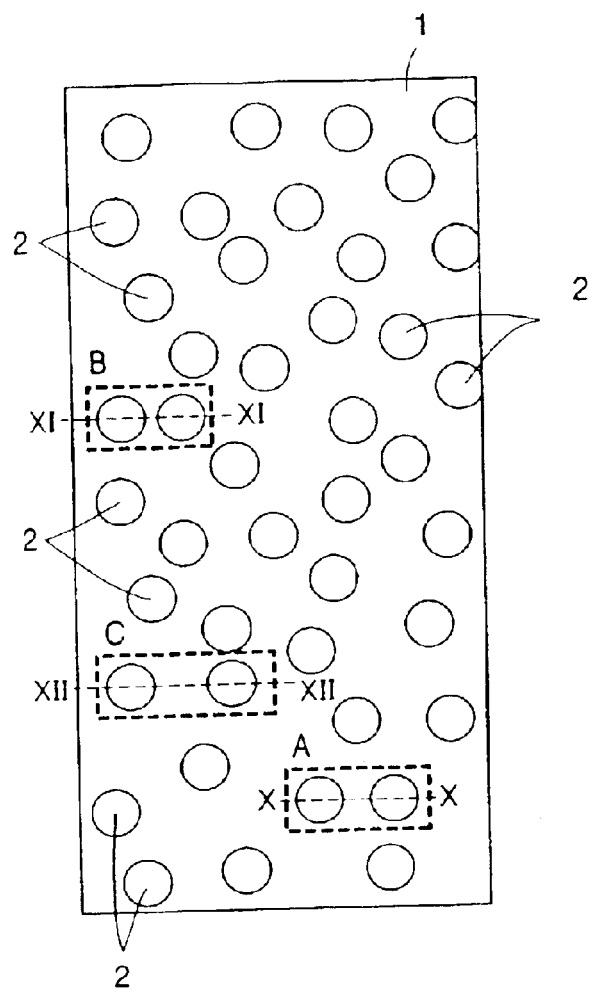
FIG. 9 shows a schematic disposition plan view of convex prominences used for another prior art reflective pixel electrode.
Figure 10:
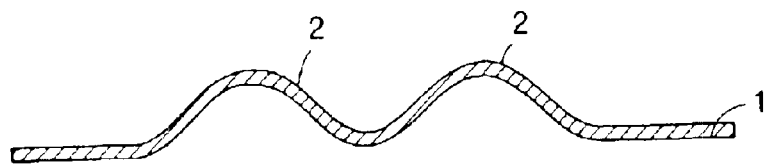
FIGS. 10, 11 and 12 are schematically sectional views cut along X—X, XI—XXI and XII—XXII of the reflective pixel electrode shown in FIG. 9, respectively.
Figure 11:
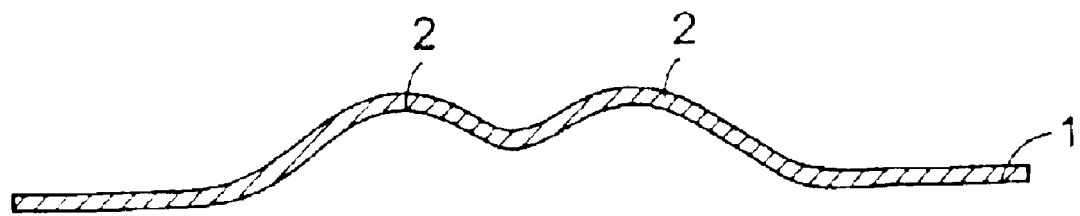
Figure 12:
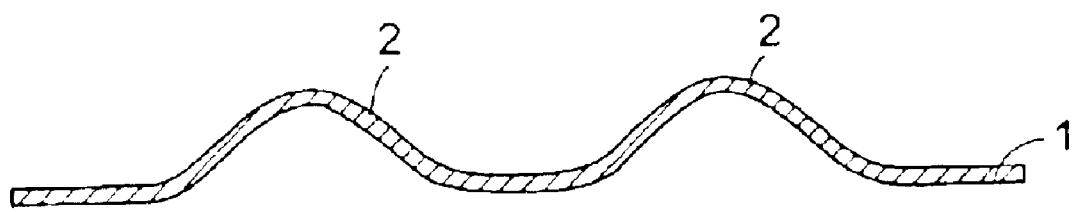

Next, a sputtering method is applied to deposit a 100 nm metal film of Aluminum (Al), nickel (Ni), chromium (Cr) or argentums (Ag) on the pattern 18. A photoetching method is used to carry out patterning the metal film, so that the reflective pixel electrodes 19 are formed as shown in FIG. 7. Thus, the reflective pixel electrodes 19 with the even patterns 20 are formed on the patterns 18 deposited on the organic resin insulation film 17. Driving voltages are supplied between the reflective and counter electrodes 19 and 25 to drive the liquid crystal layer 27 for image displays.

According to the embodiment, since the centers of the convex portions 20a of the reflective pixel electrodes are disposed in hexagonal lattice points in such a way that lattice parallel vectors rotate at an angle of about 60°, defined between the lattice points at both end portions of the reflective pixel electrode 19, but, more suitably, the one ranging from 51.4° to 68.6°, i.e., 60°±8.6°. Thus, the centers of the convex portions 20a are disposed along circular curves, the lattice parallel vectors are distributed uniformly in all directions and the uneven patterns 20 are less periodic. As a result, coloring due to interference between the convex portions 20a can be suppressed. The distances between the convex portions 20a can be kept constant, those for a maximum distance distribution of the convex portions 20a can be consistent with those from which an optimal slant angle distribution is obtained, to achieve an ideal slant angle distribution. No substantially troublesome reflection of a light source takes place from the uneven patterns 20 of the reflective pixel electrodes 19. An observer does not need to move such reflection of a light source out of the viewing angle. Specular reflection portions of the reflective pixel electrodes 19 not covered with the uneven patterns 20 are set to be a display brightness and appear to be very bright.

The rotation angle ranging from 51.4° to 68.6° set forth above is suitable because the uneven patterns 20 are not easily formed at a rotation angle that is much smaller than 51.4°. If the rotation angle, however, is bigger than 68.6°, the uneven patterns 20 do not provide any significant effects.

As described above, the shape and density of the convex and concave portions on the surface of the reflective pixel electrode 19 can be arbitrarily controlled by those of the photomask 32 and/or the exposure quantity.

This invention is applicable to not only reflection type LCD devices but also reflection and transparent type LCD devices. Concave patterns can be substituted for the convex patterns 20 with similar effects.

According to the present invention, since light scattering elements are disposed lattice points of hexagonal lattices where their parallel vectors are rotated to reduce two dimensional periodicity of the light scattering elements, coloring caused by interference between the elements can be suppressed, and excellent display quality with uniform brightness is achieved by making distances between the light scattering elements consistent with those from which a optimal slant angle distribution can be obtained.

What is claimed is:

1. A reflection member comprising:

light scattering elements with substantially same shapes disposed in lattice points of hexagonal lattices;

wherein lattice parallel vectors of said hexagonal lattices are rotated at a predetermined angle between adjacent ones of said lattice points.

2. The reflection member according to claim 1, wherein said light scattering elements project and centers of said light scattering elements are disposed in said lattice points of said hexagonal lattices.

3. The reflection member according to claim 1 or 2, wherein said lattice parallel vectors are rotated about a radius center by an angle ranging from 51.4° to 68.6° defined between said lattice points at two end portions of said reflection member.

4. A liquid crystal display device comprising:

pixel electrodes including light scattering elements with substantially same shapes disposed in lattice points of hexagonal lattices, wherein lattice parallel vectors of said hexagonal lattices are rotated by a predetermined angle between adjacent ones of said lattice points.

5. The liquid crystal display device according to claim 4, wherein said light scattering elements project and centers of said light scattering elements are disposed in said lattice points of said hexagonal lattices.

6. The liquid crystal display device according to claim 4 or 5, wherein said lattice parallel vectors are rotated about a radius center by an angle ranging from 51.4° to 68.6° defined between said lattice points at two end portions of said pixel electrode.

* * * * *